Aug. 6, 1968     E. J. HERBENAR     3,395,441
METHOD OF SPIN SWEDGING INSERTS IN HOUSINGS
Filed Oct. 23, 1965     3 Sheets-Sheet 3
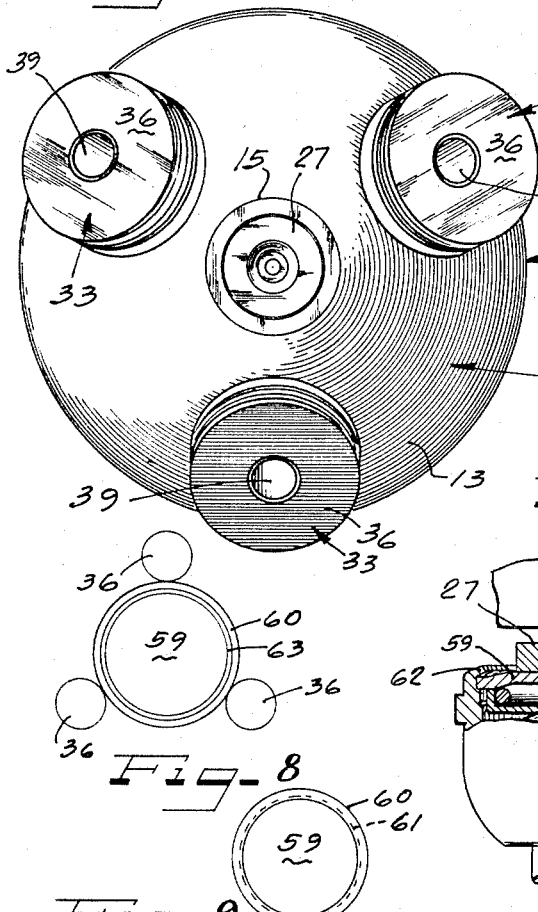
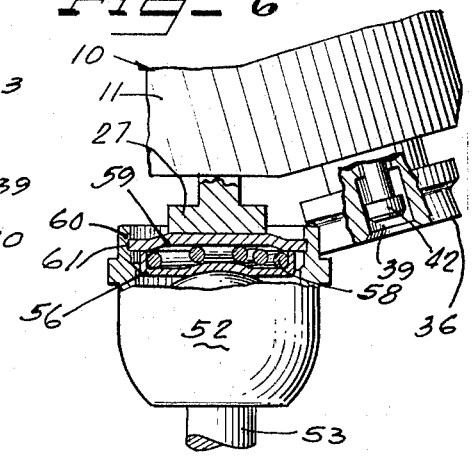
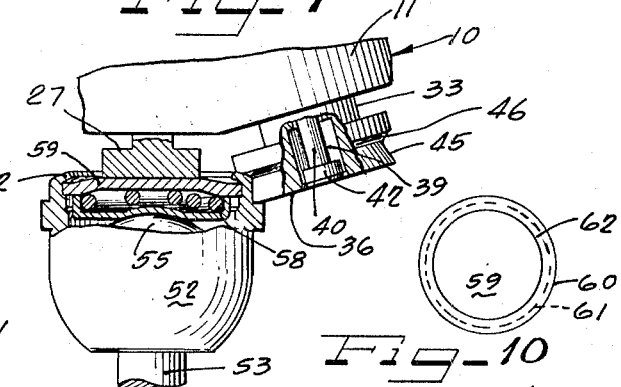
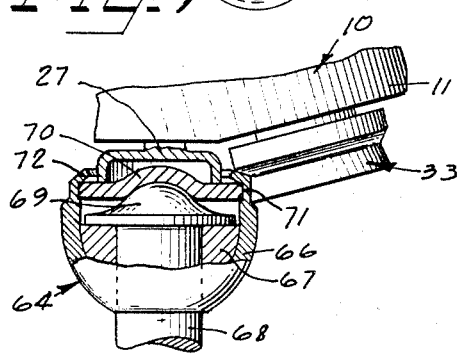
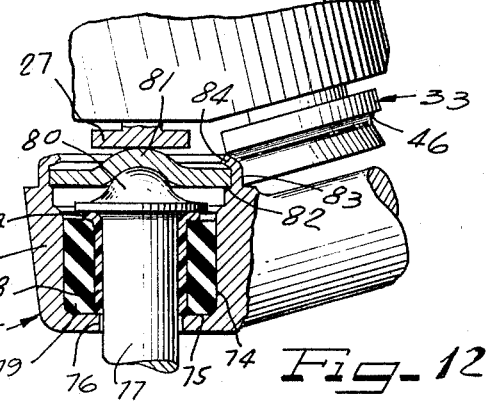
INVENTOR.
EDWARD J. HERBENAR
BY *Hill, Sherman, Meroni, Gross & Simpson* ATTORNEYS

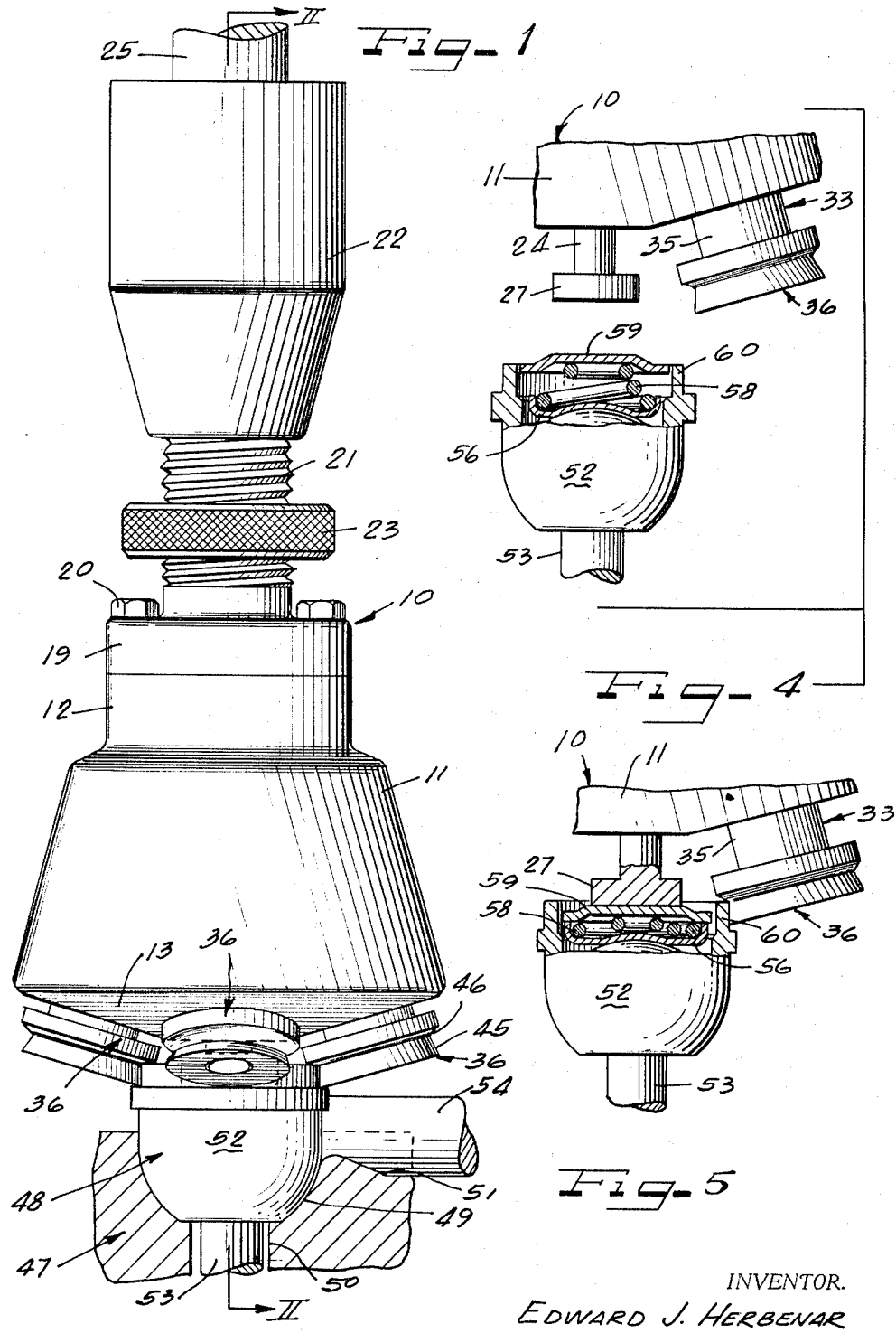

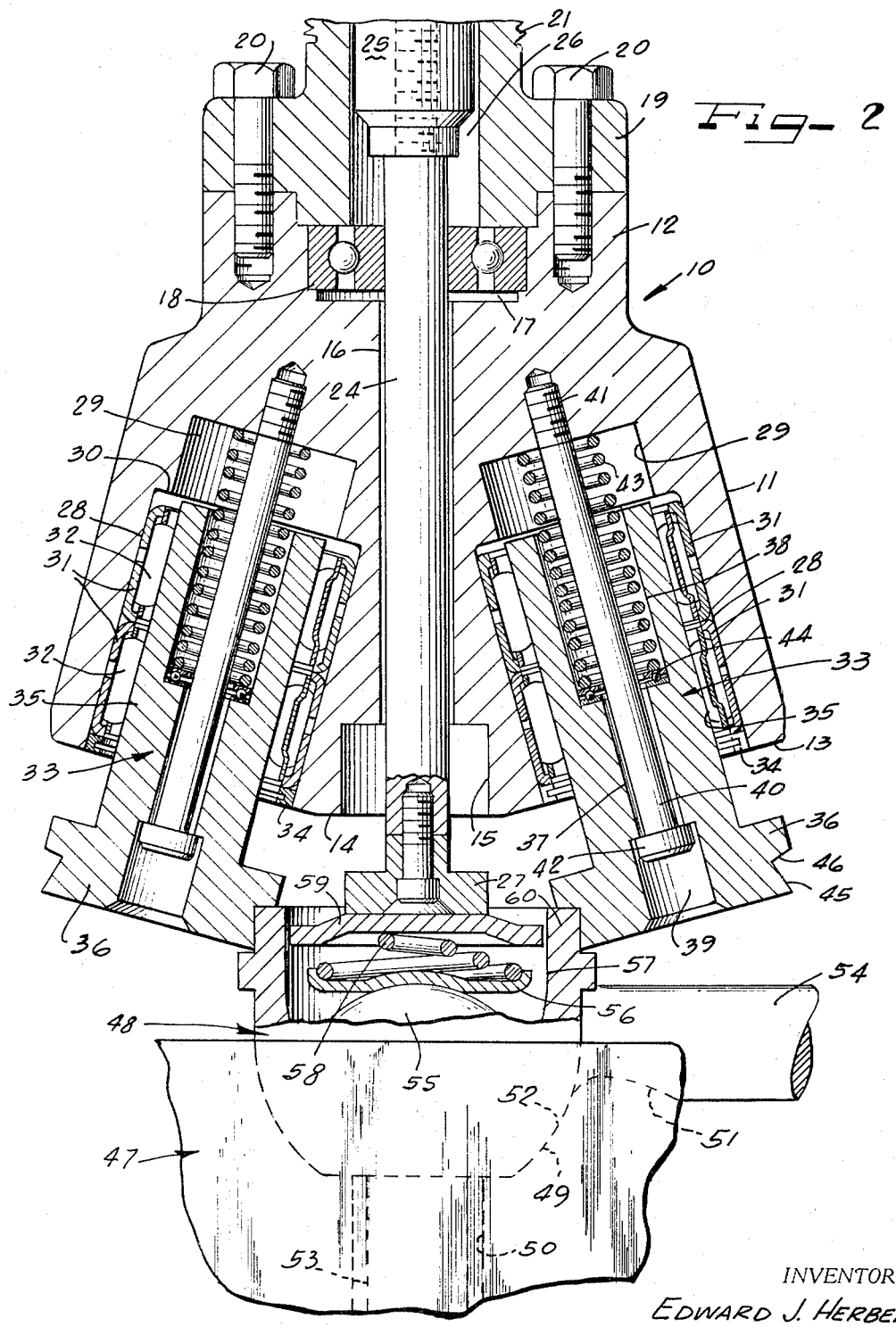

United States Patent Office 3,395,441
Patented Aug. 6, 1968

3,395,441
METHOD OF SPIN SWEDGING INSERTS IN HOUSINGS
Edward J. Herbenar, Detroit, Mich., assignor to TRW Inc., Cleveland, Ohio, a corporation of Ohio
Filed Oct. 23, 1965, Ser. No. 503,709
7 Claims. (Cl. 29—441)

ABSTRACT OF THE DISCLOSURE

A method of locking insert members, such as retainers or closure discs in surrounding members such as joint housings by embracing the surrounding member with inclined swedge rollers, orbiting the rollers about the central axis of the surrounding member, rotating the orbiting rollers about their own axis, and decreasing the orbital radius of the rollers to radially inwardly deform the surrounding member into locking engagement with the insert member. The surrounding member is first radially deformed into tight gripping relation with the periphery of the insert and is then further deformed into overlapping relation with the insert. The insert is initially pressed against components in the housing to develop a desired preload thereon and the insert may assume any level in the housing to maintain this preload.

---

This invention will hereinafter be described as embodied in a method of spin swedging the open ends of sockets for ball joints and pin joints to secure closure disks therein. It will be understood, however, that the invention is not limited to the hereinafter specifically described embodiment, being generally applicable to the swedge locking of inserts in surrounding members.

According to this invention, a closure plate or disk for a joint socket is positioned in the open end of the socket against the joint components in the socket to preload the assembly. The disk may be bottomed on an internal socket shoulder or pressed against the joint components under a controlled load to control the torque of the relatively movable elements. The portion of the socket surrounding the plate or disk is then radially contracted by swedge rollers which are spun around the socket in orbits of diminishing radii to exert a contracting force. This force is created by slidably supporting the rollers in a rotating head at an angle to the axis of rotation so that as the head advances relative to the rollers, the circumferential orbital path described by the rollers around the socket will decrease in diameter. The socket wall is forced radially inward to tightly grip the periphery of the closure plate or disk, thereby fixing it in position in the socket. The rollers then spin a lip flange over the periphery of the disk to seal the assembly and firmly lock the disk against removal from the socket.

The spin swedge tool used in the method of this invention preferably includes three swedge rollers mounted 120° apart on inclined axes in a rotating head. The rollers are free to rotate in the head and circumscribe a decreasing series of circumferences as they rotate around the socket and as the head is advanced toward the socket. The head can be mounted on a lathe, a drill press, or the like rotating driver. A plunger, acting through the head, initially engages the closure disk in the open end of the socket for bottoming the disk on a socket shoulder or for preloading the joint components as described above. This plunger can be spring actuated or actuated by a hydraulic or pneumatic cylinder to exert the desired load on the closure disk. The swedge rollers are spring pressed away from the head so as to be self-releasing from the socket after the swedging operation. Anti-friction bearings are preferably provided to mount the rollers in the head for free rotation about their own axes.

It is then an object of this invention to provide a method for spin locking inserts in surrounding members by first radially deforming the surrounding member into gripping relation with the inserted member and then overlapping the inserted member with the surrounding member.

Another object of this invention is to provide a method of spin sealing closure plates into sockets or other housings wherein the closure plate is positioned independently of the swedging load.

A still further object of the invention is to provide a method of closing joint sockets with closure plates that are initially freely received in the sockets and are secured in position by radial contraction of the sockets without shifting the plates.

Other and further objects of this invention will be apparent to those skilled in this art from the following detailed description of the annexed sheets of drawings which, by way of a preferred example only, illustrate one embodiment of the invention.

On the drawings:

FIGURE 1 is a side elevational view of apparatus used in the method of this invention acting on a joint socket;

FIGURE 2 is a vertical cross-sectional view taken along the line II—II of FIGURE 1, with parts in elevation;

FIGURE 3 is an end elevational view of the apparatus of FIGURES 1 and 2;

FIGURE 4 is a fragmentary elevational view, with parts in vertical section, illustrating the relative positions of the apparatus and joint socket to be acted thereon prior to the loading of the joint components by the apparatus;

FIGURE 5 is a view similar to FIGURE 4, but illustrating the relative positions of the apparatus and joint at the start of the swedging operation;

FIGURE 6 is a view similar to FIGURE 5, but illustrating the relative positions of the apparatus and joint parts at the completion of the radial swedging operation;

FIGURE 7 is a view similar to FIGURE 6, but showing the relative positions of the apparatus and joint parts at the completion of the lip turning operation;

FIGURE 8 is a bottom plan view of the joint socket and closure plate, illustrating the relative positions at the start of the swedging operation;

FIGURE 9 is a view similar to FIGURE 8, but illustrating the relative positions of the closure plate and joint socket at the completion of the radial swedging step;

FIGURE 10 is a view similar to FIGURE 9, but illustrating the relative positions of the closure plate and joint socket at the completion of the lip turning operation;

FIGURE 11 is a view similar to FIGURE 7, but illustrating the use of the apparatus on a socket and closure plate assembly where the closure plate is bottomed on a shoulder in the socket; and FIGURE 12 is a view similar to FIGURE 8, but ilustrating the operation of the apparatus on a pin joint assembly.

As shown on the drawings:

As shown in FIGURES 1–3, the spin swedge apparatus or tool 10 consists of a generally conical shaped rigid housing or body 11 with a cylindrical collar 12 at the small end thereof and an inclined bottom face 13 at the large end thereof which slopes from the periphery to a flat central face 14 having a cylindrical recess 15 extending upwardly therefrom to a central bore 16 extending through the entire housing into the collar 12. The collar 12 has a well or recess 17 mounting the outer race of a ball bearing assembly 18. A cap 19 is secured to the top of the collar 12 by screws 20. The cap 19 has a threaded stem 21 which is secured to a driving spindle such as a drill press chuck 22. A knurled ring 23, threaded on the stem 21, can be tightened against the end of the chuck 22 to fix the vertical position of the tool 10 on the drill press, lathe or the like.

A plunger rod 24 fits freely through the bore 16 of the head 11, and is carried in the inner race of the bearing assembly 18 so that the head 11 may rotate freely around the rod. The rod 24 projects through the collar 12 and is secured to a plunger 25 freely mounted in a central bore 26 extending through the cap 19, stem 21 and chuck 22. This plunger 25 is reciprocated by any suitable actuating means (not shown) such as a hydraulic or pneumatic ram or it can be spring loaded to exert a desired downward thrust on the rod 24. A head 27 is mounted on the bottom of the rod 24 and is adapted to be retracted into the recess 15 of the housing 11 when the rod 24 is in a raised position, or to project forwardly from the bottom face 14 of the housing when the rod is loaded to a forward position.

It should be understood that the housing 11 is rotated by the driving chuck 22 around the rod 24, which is axially shifted but does not rotate.

The housing 11 has three cylindrical bores 28 spaced 120° apart and extending up into the housing from the inclined end face 13 thereof at a predetermined angle relative to the axis of rotation of the housing. Each bore 28 has a reduced diameter bottom well 29 providing an annular shoulder 30. The angle of inclination of the bores 28 is preferably about 15°.

Bearing cages 31 are successively pressed into each bore 28 to carry needle or roller bearings 32 rotatably supporting the swedge rollers 33 of this invention. Locking rings 34 are pressed into the mouths of the bores 28 to hold the cages of bearings in the bores.

Each swedge roller 33 has a cylindrical stem or shank 35 rotatably carried by the rollers 32 and freely slidable over the rollers to project into the well 29 at the inboard end of the bore 28. Each swedge roller 33 also has an enlarged head 36 at the bottom end thereof larger than the bore 28 and projecting below the bottom face 13 of the head 11. A central bore 37 extends through the swedge roller 33 and is counterbored at the inboard end of the stem 35 to provide a well 38 and at the head end 36 to provide a second well 39. A mounting bolt 40 extends freely through the bore 37 and is threaded into a tapped hole 41 at the bottom of the well 29. The mounting bolt 40 has a head 42 bottomed in the counterbore 39. A coil spring 43 surrounds the bolt 40, being bottomed at the inboard end on the bottom of the well 29 and at the outboard end on an anti-friction thrust bearing 44 seated in the inboard end of the counterbore 38. The spring 43 urges the swedge roller unit 33 to an outermost position where the head 36 depends in spaced relation from the end face 13 of the housing 11. In this position, the bolt head 42 is bottomed at the bottom of the counterbore 39 to limit the outward projection of the unit 33. However, the unit 22 can be depressed inwardly against the load of the spring 43 to enter the well 29, thereby moving the head 36 close to the end face 13 of the housing.

Each swedge roller unit 33 is thus rotatably mounted in the housing 11 about an inclined axis relative to the axis of rotation of the housing and each swedge roller 33 is slidable relative to the housing so that as the housing advances in a downward direction over the shanks 35 of the swedge units 33, the heads 36 of these units will move closer toward the axis of rotation of the housing 11.

The head 36 of each unit 33 has a swedging periphery 45 cut at such an angle relative to the angle of inclination of the unit 33 so as to present a swedging face parallel to the axis of rotation of the housing 11. This inclined periphery 45 thus tapers inwardly and upwardly from the bottom end of the head 36. An upwardly and outwardly inclined shoulder 46 is provided at the top of the periphery 45 to overlie the work piece at the end of the radial swedging operation for forming an overlying lip, as will be more fully hereinafter described.

A fixture 47 is provided to support the work piece such as the ball joint 48 to be acted upon by the swedge rollers 33. This support 47 has a central cup-shaped recess 49 with an aperture 50 through the bottom thereof and a trough 51 extending laterally from the top thereof. The recess 49 receives the socket or housing 52 of the joint 48 with the stud or pin 53 of the joint extending freely through the aperture 50 and the stem 54 of the joint socket seated in the trough 51.

The work piece 58, of course, may take many different forms and the supporting fixture or bed 47 can be designed and shaped accordingly.

The socket 52, in the form of the work piece illustrated in FIGURES 1-4, 6 and 7, receives the ball head 55 of the joint stud 53 in tiltable and rotatable relation. This ball head 55 is backed by a retainer washer 56 fitting freely in the cylindrical end bore 57 of the socket. A coil spring 58 is compressed between this retainer 56 and the closure plate 59 for the socket. As illustrated, this closure plate 59 is a circular disk fitting snugly but freely in the bore 57 of the socket and having a depressed central portion receiving the small end coil of the spring 58. The disk is composed of metal and its function is to close and seal the socket 52 as well as to load the spring 58 so that the ball head 55 will be maintained in good bearing relation with the bearing wall of the socket.

To lock the closure plate 59 into fixed sealed engagement with the socket 52, the work piece 48 is mounted in the fixture 47, as shown in FIGURES 1 and 2, and the plunger rod 24 is loaded so that the plunger head 27 will press the closure disk 59 into the socket bore 57, thereby compressing the spring 58 and preloading the joint components to the exact desired degree. Thus, the plunger cap 27 initially engages the closure disk 59 to depress it from the level shown in FIGURE 4 to the level shown in FIGURES 2 and 5. Then, the tool head 11 is lowered to cause the swedge roller heads 36 to embrace the top open end of the socket 52. This top open end has a cylindrical skirt portion 60 which is adapted to be deformed by the roller heads 36, and as shown in FIGURE 2, the periphery of this skirt 60 is embraced by the peripheries 45 of the roller heads 36, the line of contact being substantially parallel with the outer periphery of this skirt 60. The tool head 11 is then rotated by the chuck drive 22, thereby orbiting the roller heads 36 around the skirt 60 while at the same time these roller heads are free to rotate about their own inclined axes in the head 11. The head 11 is next forced downwardly over the roller units, thus compressing the springs 43 and moving the inboard ends of the rollers into the wells 29. Free rotation of the rollers about their own axes is uninhibited because the springs 43 are bottomed on the anti-friction thrust bearings 44. However, as the head 11 moves downwardly, the rollers are drawn toward the axis of rotation of the head due to the inclined axis of rotation of each roller. This inward movement of the rollers causes the peripheries 45 thereof to radially deform the skirt 60 inwardly to the position shown in FIGURE 6 where the skirt wraps over and under the periphery of the closure plate 59 causing the plate to be clamped in a groove 61 having shoulders overlying and underlying the periphery of the plate. It will be noted at this stage that the deformation of the skirt has been radially inward and has not, in any way, changed the axial load on the closure plate 59 created by the plunger assembly. The closure plate 59 is thus locked in the exact position determined by the load imposed thereon from the plunger assembly.

After the condition of FIGURE 6 has been reached, a further lowering of the head 11 will bring the tapered shoulders 46 of the rollers into engagement with that portion of the skirt 60 overlying the closure plate 59, causing the skirt to be spun over the closure plate forming a locking lip 62 around the periphery of the plate, as shown in FIGURE 7. The socket 52 is thus sealed and the lip 62 adds a safety flange to prevent the closure plate from popping out of the socket.

FIGURES 4–7 illustrate the successive steps in loading the closure plate to the desired level in the socket and then spin locking the plate in fixed sealed engagement at this position with the socket. It will be noted that the head 11 advances downwardly over the swedge rollers 33 as the swedging operation progresses and, of course, the springs 43 must be compressed to accommodate this downward movement of the head relative to the rollers. After the swedging operation, the head is raised and the compressed springs will eject the rollers from the head, thereby moving them back to their initial skirt embracing position. Since the skirt has been radially deformed, it will not be in contact with the roller peripheries 45 at this position and the tool is free of the work piece. Thus, as shown in FIGURES 8–10, the skirt 60 in its unformed position of FIGURE 8, surrounds the closure disk 59 and a slight gap 63 remains between the skirt and periphery of the closure disk. Then, as shown in FIGURE 9, as the skirt 60 is deformed radially inward by the swedge rollers, it embraces the periphery of the closure disk 59 in the groove illustrated at 61. Next, as shown in FIGURE 10, as the lip or flange 62 overlies the closure disk 59, the finished outer diameter of the skirt 60 is appreciably less than its original outer diameter and the skirt will not be engaged by the rollers when they assume their starting positions of FIGURES 2 and 4.

The work piece 48 may take other forms such as the joint 64 of FIGURE 11 or the joint 65 of FIGURE 12. The joint 64 has a cup-shaped housing 66 tiltably supporting a bearing ring 67 which in turn receives a stud 68 therethrough having a head 69 in the socket overlying the bearing 67. This head 69 has a rounded top central end directly engaged by the closure plate 70. The stud and bearing ring are preloaded in the socket 66 by the plunger head 27 of the tool 10 and the swedging rollers 33 of the tool deform the skirt 71 of the socket, first radially inward to embrace the periphery of the closure plate and then to form the overlapping flange 72, overlying the closure plate. This work piece 64 does not have the spring and the components are preloaded to the exact desired degree in the socket.

The work piece 65 has a generally cup-shaped socket 73 providing a cylindrical bore 74 closed by a bottom 75 having the central aperture 76 therethrough receiving a pin 77. The pin 77 is embraced by a plastic sleeve 78 which can be composed of nylon, Teflon, or the like. This sleeve 78 is mounted in a rubber or other resilient material bushing 79 and has an outturned flange 78a overlying the bushing. The pin 77 has a head 80 riding on the flange 78a and provided with a domed central portion seated in the recess of a closure plate 81. In this arrangement, the closure plate 81 is seated on a radial shoulder 82 formed in the socket 73 and the skirt 83 of the socket is spun over the periphery of the closure plate by the shoulder 46 of the swedge rollers 33 to form the overlying lip 84. In this form, the initial radial deformation may be dispensed with because the closure plate 81 is positioned on the shoulder 82 at a fixed level and the swedge roller need only spin the flange 84 over the periphery of the closure disk to clamp the disk between the shoulder 82 and this flange 84.

From the above descriptions, it will, therefore, be understood that this invention provides a method for spin swedging housings or the like around closure plates or the like in such a manner as to maintain a desired load on the components in the housings regardless of the deformation accompanying the swedging operation.

Although minor modifications might be suggested by those versed in the art, it should be understood that I wish to embody within the scope of the patent granted hereon, all such modifications as reasonably and properly come within the scope of my contribution to the art.

I claim as my invention:

1. The method of swedge locking an insert in a surrounding member which comprises pressing the insert into the surrounding member under a controlled load, spinning a swedge tool around the surrounding member at the level of the insert in the member, and progressively decreasing the radius of revolution of the tool to deform the surrounding member radially inward into clamping engagement with the periphery of the insert without changing said controlled load.

2. The method of swedge closing a joint housing and the like which comprises pressing a closure plate into the open end of a joint housing to a desired level therein, embracing the joint housing with a plurality of swedge rollers at the level of the closure plate, orbiting the swedge rollers around the housing, rotating the swedge rollers about their own axes during said orbiting, and progressively decreasing the orbital radius for deforming the joint housing radially inward into clamping engagement with the periphery of said closure plate and then into overlapped relation with said periphery.

3. The method of spin swedging a closure plate in a joint housing having an open end which comprises pressing the closure plate into the open end of the housing to a desired level, embracing the housing with a plurality of equally spaced inclined swedge rollers, orbiting the rollers about the central axis of the housing, rotating the orbiting rollers about their own axes, simultaneously decreasing the orbital radius of all of the rollers to radially inwardly deform the housing around the periphery of said closure plate, and then overlapping the open end of the housing over the closure plate.

4. The method of spin swedging a closure plate in a joint socket which comprises urging a plunger against the closure plate into the socket for preloading the joint components, rotating a plurality of swedge rollers about the plunger, spring loading the swedge rollers along inclined axes to position the rollers sufficiently apart to freely receive the joint socket therebetween, orbiting the rollers about the axis of the joint socket, rotating the rollers on the joint socket about their own axes, progressively loading the springs to decrease the orbiting radius of the rollers causing them to circumscribe progressively decreasing circumferences, thereby deforming the embraced socket radially inward into clamped engagement with the inserted closure plate, spinning an end portion of the socket over the closure plate after said radial deformation of the socket, and expanding the springs to release the rollers from the socket.

5. The method of spin swedging a closure plate in a joint housing socket or the like which comprises the steps of pressing a closure plate into the socket to a desired level, embracing the socket with a plurality of swedging rollers engaging the periphery of the socket, orbiting the rollers about the axis of the socket, rotating the rollers on the socket about their own axes, progressively decreasing the orbital radius of the rollers to progressively radially inwardly deform the socket into clamped engagement with said closure plate overlying the end of the socket with shoulders on the rollers, and then engaging said shoulders with the end of the socket to form a radial lip around the socket.

6. The method of preloading the components of a joint assembly having a socket, a bearing in the socket, a stud projecting from the socket and having a head in the socket carried by the bearing in articulate relation therewith and a retainer in the socket loading the bearing and stud which comprises inserting the retainer freely in the socket, pressing the retainer into the socket in thrusting relation with the stud and bearing to preload the components in the socket to a desired amount, locally deforming the socket radially inward around the periphery of the retainer after the retainer has reached the depth for producing the desired preload, and further deforming the socket over both faces of the retainer to lock the retainer in the socket for maintaining the preload on the stud developed by the initial pressing of the retainer into the socket.

7. The method of preloading components in a socket and locking the components in the preloaded condition which comprises stacking components including a retainer in a housing having at least one open end, pressing the stack of components into the housing to develop a desired preload thereon, spin swedging the housing radially inwardly around the periphery of the retainer to move the housing into tight gripping relation with the retainer and further spin swedging the housing into overlapped and underlapped relation with the periphery of the retainer for locking the retainer in the housing to maintain the preload on the components.

References Cited

UNITED STATES PATENTS

| | | |
|---|---|---|
| 1,899,645 | 2/1933 | Sneed. |
| 2,027,560 | 11/1936 | Skillman _____ 287—90 |
| 2,329,770 | 9/1943 | Knox _____ 29—511 |
| 2,651,488 | 9/1953 | Sauer. |
| 3,067,709 | 12/1962 | Conti et al. _____ 29—511 |

CHARLIE T. MOON, *Primary Examiner.*